(12) United States Patent
Pan et al.

(10) Patent No.: US 9,459,948 B2
(45) Date of Patent: Oct. 4, 2016

(54) AUXILIARY METHOD, APPARATUS AND SYSTEM FOR DIAGNOSING FAILURE OF VIRTUAL MACHINE

(71) Applicant: Huawei Technologies Co., Ltd., Shenzhen (CN)

(72) Inventors: Jianmin Pan, Shanghai (CN); Li Li, Shanghai (CN); Houqing Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 14/145,007

(22) Filed: Dec. 31, 2013

(65) Prior Publication Data

US 2014/0122941 A1    May 1, 2014

Related U.S. Application Data

(63) Continuation of application No. PCT/CN2013/071983, filed on Feb. 28, 2013.

(30) Foreign Application Priority Data

Mar. 22, 2012 (CN) .......................... 2012 1 0077456

(51) Int. Cl.
*G06F 11/00* (2006.01)
*G06F 11/07* (2006.01)
(Continued)

(52) U.S. Cl.
CPC ......... *G06F 11/079* (2013.01); *G06F 11/1484* (2013.01); *G06F 11/328* (2013.01); *G06F 11/0712* (2013.01)

(58) Field of Classification Search
CPC . G06F 11/1484; G06F 11/328; G06F 11/327
See application file for complete search history.

(56) References Cited

U.S. PATENT DOCUMENTS 6,003,143 A      12/1999  Kim et al. ...................... 714/38
8,175,863 B1 *   5/2012   Ostermeyer ........ G06F 17/5009
                                                           703/13
(Continued)

FOREIGN PATENT DOCUMENTS

CN     1391174 A      1/2003
CN     101833497      9/2010
(Continued)

OTHER PUBLICATIONS

Chinese Office Action issued Apr. 21, 2014, in corresponding Chinese Patent Application No. 201210077456.9.
(Continued)

*Primary Examiner* — Philip Guyton
(74) *Attorney, Agent, or Firm* — Staas & Halsey LLP

(57) ABSTRACT

Embodiments of the present invention relate to an auxiliary method, apparatus, and system for diagnosing a failure of a virtual machine. An operation and maintenance system receives a failure message when a virtual machine fails; obtains running information of the virtual machine according to identifier information carried in the message, where the running information is used for diagnosing the failure of the virtual machine; generates graphic multi-dimensional display information of the virtual machine according to the running information; and sends the display information to a user end for displaying. The present invention provides an auxiliary method for diagnosing a failure of a virtual machine. The method may provide correlation analysis for diagnosing a failure of a virtual machine, allow the user end to diagnose the cause of the failure of the virtual machine in a comprehensive multi-dimensional manner, and improve the convenience and accuracy of diagnosing the virtual machine.

12 Claims, 12 Drawing Sheets

(51) Int. Cl.
  *G06F 11/32* (2006.01)
  *G06F 11/14* (2006.01)

(56) References Cited

U.S. PATENT DOCUMENTS

| | | | |
|---|---|---|---|
| 8,738,972 B1* | 5/2014 | Bakman | G06F 11/0712 714/47.1 |
| 2002/0190868 A1 | 12/2002 | Dearborn et al. | 340/691.1 |
| 2009/0172666 A1* | 7/2009 | Yahalom | G06F 3/0605 718/1 |
| 2010/0318990 A1 | 12/2010 | Hou et al. | 718/1 |
| 2011/0307889 A1* | 12/2011 | Moriki | G06F 9/45558 718/1 |
| 2012/0311475 A1* | 12/2012 | Wong | G06F 11/3003 715/772 |

FOREIGN PATENT DOCUMENTS

| | | |
|---|---|---|
| CN | 101847116 A | 9/2010 |
| CN | 101917460 | 12/2010 |
| CN | 102662821 | 9/2012 |
| JP | 8-83197 | 3/1996 |

OTHER PUBLICATIONS

International Search Report mailed Jun. 6, 2013 in corresponding International Application No. PCT/CN2013/071983.

* cited by examiner

AUXILIARY METHOD, APPARATUS AND SYSTEM FOR DIAGNOSING FAILURE OF VIRTUAL MACHINE

CROSS-REFERENCE TO RELATED APPLICATIONS

This application is a continuation of International Application No. PCT/CN2013/071983 filed on Feb. 28, 2013, which claims priority to Chinese Patent Application No. 201210077456.9, filed on Mar. 22, 2012, both of which are hereby incorporated by reference in their entireties.

TECHNICAL FIELD

Embodiments of the present invention relate to the virtual machine field, and in particular, to an auxiliary method, apparatus and system for diagnosing a failure of a virtual machine.

BACKGROUND

At present, a virtual data maintenance system is generally used in the cloud computing field to perform failure diagnosis and operations on multitudinous virtual machines, and bottom-layer scheduling records of the virtual machines become an important auxiliary means for diagnosing failures of virtual machines in a cloud system. Generally, because of an internal policy and manual intervention, a virtual machine generates many events, and in a scenario of failure handling, these events are important bases for maintenance personnel to diagnose failures of virtual machines.

In the prior art, the bottom-layer scheduling records of the virtual machines are generally available only in the form of an operation log. Operation types recorded in the operation log include: setting a monitoring alarm threshold; modifying basic configurations of elastic computing; adding, modifying, and deleting a virtual machine specification; releasing, modifying, and deleting a virtual disk image; adding, deleting, and modifying operation and maintenance system (Operations and Maintenance system, OMS) administrator information; powering on/off and restarting a physical server; migrating a virtual machine; creating an ISO virtual machine, and so on. Maintenance personnel are unable to trace service interaction information at the cloud bottom layer of a virtual machine by merely using these operation logs. This is a function deficiency in multi-dimensional maintenance means centering on virtual machines.

In the prior art, if tracing is performed according to operation logs, maintenance personnel are faced with a huge amount of information and unable to mine the service interaction information at the cloud bottom layer and unable to see logical relationships between multiple states and multiple events easily. Therefore, correlation analysis cannot be provided for diagnosing a failure of a virtual machine, and the cause of the failure of the virtual machine cannot be further determined in a comprehensive multi-dimensional manner.

SUMMARY

Embodiments of the present invention provide an auxiliary method, apparatus, and system for diagnosing a failure of a virtual machine, which may provide correlation analysis for diagnosing a failure of the virtual machine, diagnose the cause of the failure of the virtual machine in a comprehensive multi-dimensional manner, mine the deeper cause of the failure of the virtual machine, and improve the convenience and accuracy of diagnosing the virtual machine.

In one aspect, an embodiment of the present invention provides an auxiliary method for diagnosing a failure of a virtual machine, where the method includes:

receiving a failure message reported when a virtual machine fails, where the reported failure message carries identifier information of the virtual machine;

obtaining running information of the virtual machine according to the identifier information, where the running information of the virtual machine is used for diagnosing the failure of the virtual machine;

generating graphic multi-dimensional display information of the virtual machine according to the running information; and sending the graphic multi-dimensional display information of the virtual machine to a user end for displaying.

In another aspect, an embodiment of the present invention provides an auxiliary apparatus for diagnosing a failure of a virtual machine, where the apparatus includes:

a receiving unit, configured to receive a failure message reported when a virtual machine fails, where the reported failure message carries identifier information of the virtual machine;

an obtaining unit, configured to obtain running information of the virtual machine according to the identifier information, where the running information of the virtual machine is used for diagnosing the failure of the virtual machine;

a generating unit, configured to generate graphic multi-dimensional display information of the virtual machine according to the running information; and a sending unit, configured to send the graphic multi-dimensional display information of the virtual machine to a user end for displaying.

In still another aspect, an embodiment of the present invention provides an auxiliary system for diagnosing a failure of a virtual machine, where the system includes the auxiliary apparatus for diagnosing a failure of the virtual machine and a virtual machine.

In the embodiments of the present invention, after a virtual machine fails, an operation and maintenance system receives a failure message reported when the virtual machine fails, where the reported failure message carries identifier information of the virtual machine; obtains running information of the virtual machine according to the identifier information, where the running information of the virtual machine is used for diagnosing the failure of the virtual machine; generates graphic multi-dimensional display information of the virtual machine according to the running information; and sends the graphic multi-dimensional display information of the virtual machine to a user end for displaying. Multi-dimensional information such as state information, operation information, alarm information, and CPU usage information of the virtual machine is identified in the graphic multi-dimensional display information. Therefore, according to the graphic multi-dimensional display information, the user end can perform correlation analysis for diagnosing the failure of the virtual machine, diagnose the cause of the failure of the virtual machine in a comprehensive multi-dimensional manner, and determine the root cause of the failure of the virtual machine, so that a user can diagnose the cause of the failure of the virtual machine in a comprehensive multi-dimensional manner and mine the deeper cause of the failure of the virtual machine, thereby improving the convenience and accuracy of diagnosing the virtual machine.

DESCRIPTION OF EMBODIMENTS

The technical solutions of the present invention are hereinafter described in detail with reference to the accompanying drawings and embodiments.

The embodiments of the present invention provide an auxiliary method, apparatus, and system for diagnosing a failure of a virtual machine. In actual applications, the method as a new auxiliary method for diagnosing a failure of the virtual machine may be applicable in a cloud system in a scenario where a virtual machine fails. There are many possible causes for a failure of the virtual machine. The possible causes may be too high CPU usage due to too many programs running on a virtual machine, the failure of an operation performed on the virtual machine, and so on. The embodiments of the present invention provide an auxiliary method for diagnosing the cause of a failure of the virtual machine by using graphic multi-dimensional display information which is generated according to the running information of a virtual machine in a cloud system when the virtual machine in the cloud system fails.

In view of the present status of the auxiliary method for diagnosing the cause of a failure of the virtual machine in the prior art, the embodiments of the present invention provide an auxiliary method, apparatus, and system for diagnosing a failure of the virtual machine. After a virtual machine fails, an operation and maintenance system receives a failure message reported when the virtual machine fails, where the reported failure message carries identifier information of the virtual machine; obtains running information of the virtual machine according to the identifier information, where the running information of the virtual machine is used for diagnosing the failure of the virtual machine; generates graphic multi-dimensional display information of the virtual machine; and sends the graphic multi-dimensional display information of the virtual machine to a user end for displaying.

Figure 1:
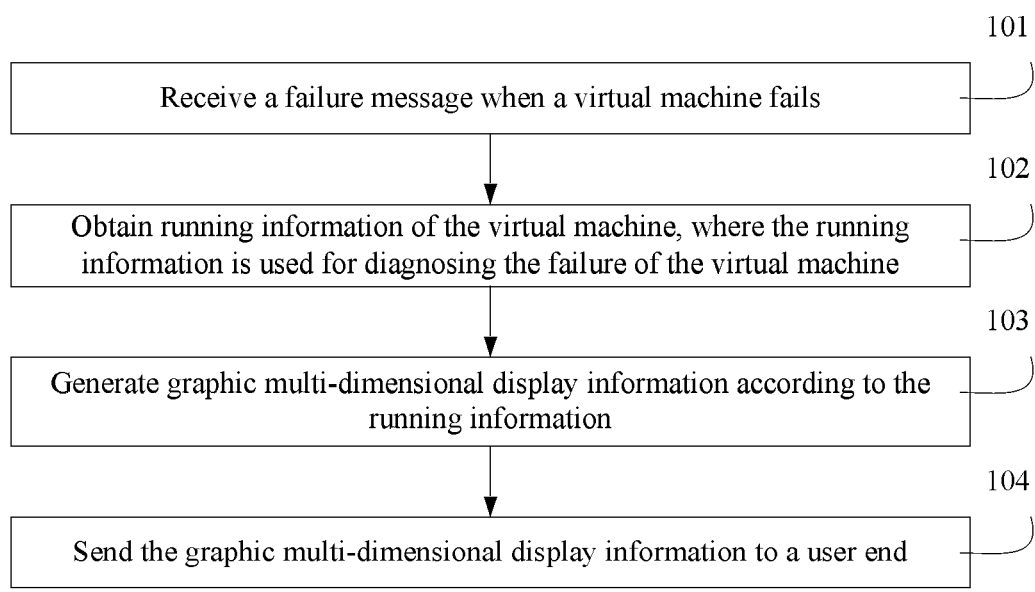
FIG. 1 is a flowchart of an auxiliary method for diagnosing a failure of a virtual machine according to an embodiment of the present invention.

FIG. 1 is a flowchart of an auxiliary method for diagnosing a failure of a virtual machine according to an embodiment of the present invention. The executor of the embodiment is an operation and maintenance system of a virtual machine. Detailed in the embodiment is a method for assisting a user end in diagnosing the cause of a failure of the virtual machine by displaying running information of the virtual machine as graphic multi-dimensional display information. As shown in FIG. 1, the embodiment includes the following steps:

Step 101: The operation and maintenance system receives a failure message reported when a virtual machine fails, where the reported failure message carries identifier information of the virtual machine.

After the virtual machine fails, the virtual machine may send a failure message of the virtual machine through a virtual machine provider, and the virtual machine provider sends the failure message of the virtual machine to the operation and maintenance system, where the message carries the identifier information of the virtual machine, such as the name of the virtual machine, the IP address of the virtual machine, and the user name of a user of the virtual machine. If the virtual machine is a very important virtual machine, the operation and maintenance system may also actively monitor the running status of the virtual machine. If the virtual machine fails, the operation and maintenance system may receive a notification message.

Step 102: The operation and maintenance system obtains running information of the virtual machine according to the identifier information, where the running information of the virtual machine is used for diagnosing the failure of the virtual machine.

The running information includes the runtime of the virtual machine, an operation that occurs on the virtual machine, an alarm, and CPU usage.

Step 103: The operation and maintenance system generates graphic multi-dimensional display information of the virtual machine according to the running information.

The operation and maintenance system obtains running information of the virtual machine according to the identifier information of the virtual machine, and generates graphic multi-dimensional display information of the virtual machine according to the running information. The graphic multi-dimensional display information includes state information, operation identifier information, alarm level information, detailed information, central processing unit CPU usage information, and runtime information of the virtual machine.

The generating graphic multi-dimensional display information of the virtual machine according to the running information specifically includes: displaying the running information in different forms according to different categories in a coordinate system that uses the runtime information as an x-axis and uses the CPU usage information as a y-axis.

Multi-dimensional display information refers to displaying the state information, the operation identifier information, the alarm level information, the detailed information, the central processing unit CPU usage information, and the runtime information intuitively on a coordinate map in a chart, so that correlation between the state information, operation identifier information, alarm level information, detailed information, CPU usage information, and runtime information of the virtual machine is clearer. Displaying the running information in different forms according to different categories in a coordinate system that uses the runtime information as an x-axis and uses the CPU usage information as a y-axis specifically includes: displaying the state information of the virtual machine above the x-axis of the coordinate system in the form of a combined color stripe and text label; displaying the operation identifier information and the alarm level information above the state information of the virtual machine in the form of a text label; displaying the runtime information below the x-axis of the coordinate system in the form of a text label; and displaying the CPU usage information in the coordinate system in the form of a broken line.

Figure 2:
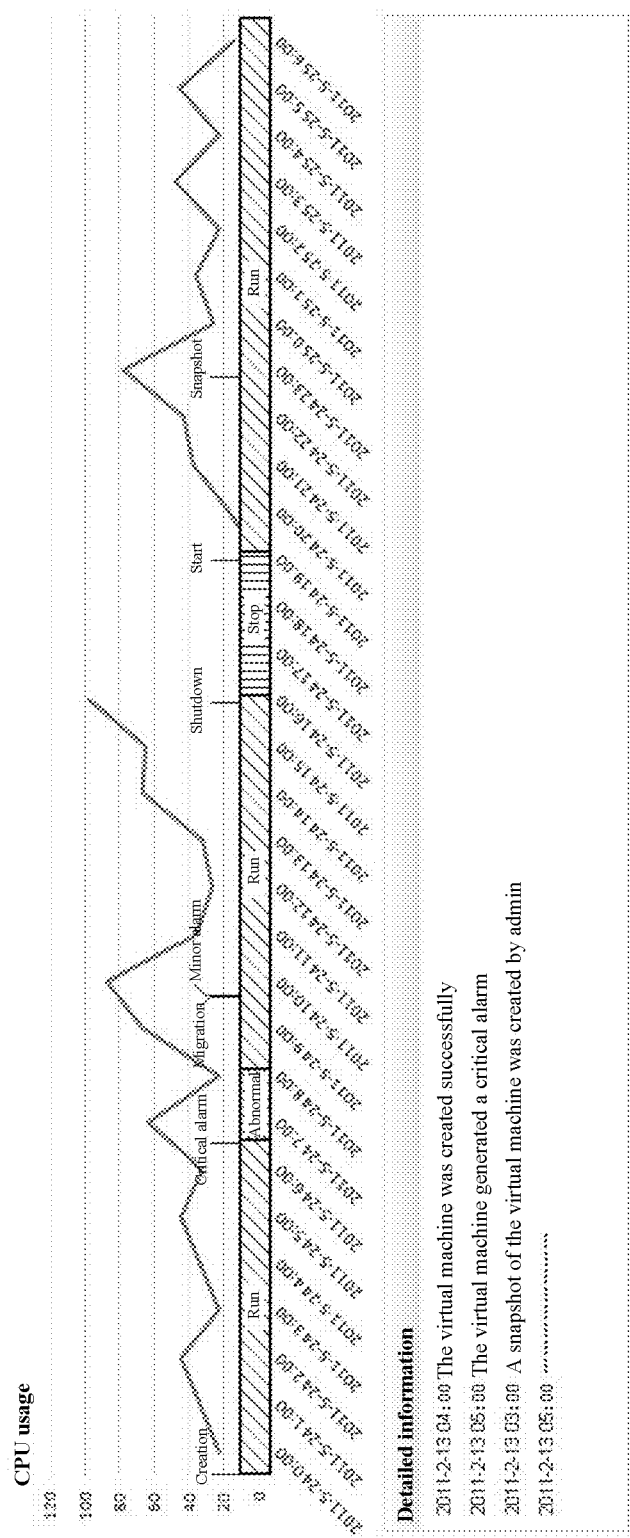
FIG. 2 is a schematic diagram of graphic multi-dimensional display information of a virtual machine provided by an operation and maintenance system according to an embodiment of the present invention.

FIG. 2 is a schematic diagram of graphic multi-dimensional display information of a virtual machine provided by an operation and maintenance system according to an embodiment of the present invention. In FIG. 2, the graphic multi-dimensional display information of the virtual machine is provided according to a runtime sequence, including CPU usage information, operation information, alarm information, state information, and detailed information of the running of the virtual machine.

The CPU usage information indicates the state of a program running on the virtual machine at a time point. In FIG. 2, the change of CPU usage is displayed in the form of a broken line. Higher CPU usage indicates that more programs are running on the virtual machine at this time point, and conversely, lower CPU usage indicates that fewer programs are running on the virtual machine at this time point. The value of CPU usage is directly related to the strength of the CPU of the virtual machine. If the CPU usage is higher, the virtual machine runs more slowly and even stops running.

The operation identifier information identifies an operation that occurs on the virtual machine. In FIG. 2, the operation identifier information is presented in the form of a text. The operation identifier information of the virtual machine mainly includes creation, snapshot, shutdown, start, and migration.

The alarm level information identifies level information of an alarm that occurs on the virtual machine in a running process. In FIG. 2, the alarm level information is presented in the form of a text. The alarm level information includes a critical alarm, and a minor alarm.

The state information identifies the state of the virtual machine, and is presented in the form of a continuous color stripe. If 12 states of the virtual machine are all presented, the state display in FIG. 2 is too jumbled. Therefore, the embodiment of the present invention optimizes the graphic display of state information. A specific optimization method is: some states are transient, and therefore are presented together with other states; and some states may be understood as operations and therefore are not presented as states.

The embodiment of the present invention retains the graphic display of only four states, which are: running, sleep, stop, and abnormal.

The detailed information of the running of the virtual machine identifies detailed information corresponding to the running information of the virtual machine, and is displayed in the form of a text. After the operation and maintenance system performs processing according to a received processing instruction sent by the user end with respect to the operation identifier information or the alarm level information, the operation and maintenance system may also generate the detailed information in the graphic multi-dimensional display information according to service transfer information, which is obtained after the processing, of the operation corresponding to the operation identifier information, or generate the detailed information in the graphic multi-dimensional display information according to relevant information of an alarm corresponding to the alarm level information.

Step 104: The operation and maintenance system sends the graphic multi-dimensional display information of the virtual machine to a user end for displaying.

The operation and maintenance system sends the graphic multi-dimensional display information to the user end, so that a receiver side, for example, the user end, diagnoses the failure of the virtual machine after receiving the information.

After step 104 in the embodiment of the present invention, further processing is performed according to a received processing instruction sent by the user end with respect to the operation identifier information or the alarm level information, and the detailed information in the graphic multi-dimensional display information is generated according to service transfer information, which is obtained after the processing, of the operation corresponding to the operation identifier information, or the detailed information in the graphic multi-dimensional display information is generated according to relevant information of an alarm corresponding to the alarm level information, and then the detailed information is sent to the user end.

Of course, after the user end receives the graphic multi-dimensional display information, if the user end cannot intuitively determine the cause of the failure of the virtual machine according to the graphic multi-dimensional display information directly, the user end sends a corresponding processing instruction with respect to the operation identifier information or alarm level information to the operation and maintenance system to obtain the detailed information corresponding to the service transfer information of the operation corresponding to the operation identifier information or the detailed information corresponding to the relevant information of the alarm corresponding to the alarm level information; then the operation and maintenance system performs processing according to the received processing instruction with respect to the operation identifier information or the alarm level information, and sends the detailed information corresponding to the service transfer information, which is obtained after the processing, of the operation corresponding to the operation identifier information, or the detailed information corresponding to the relevant information of the alarm corresponding to the alarm level information to the user end.

Figure 3:
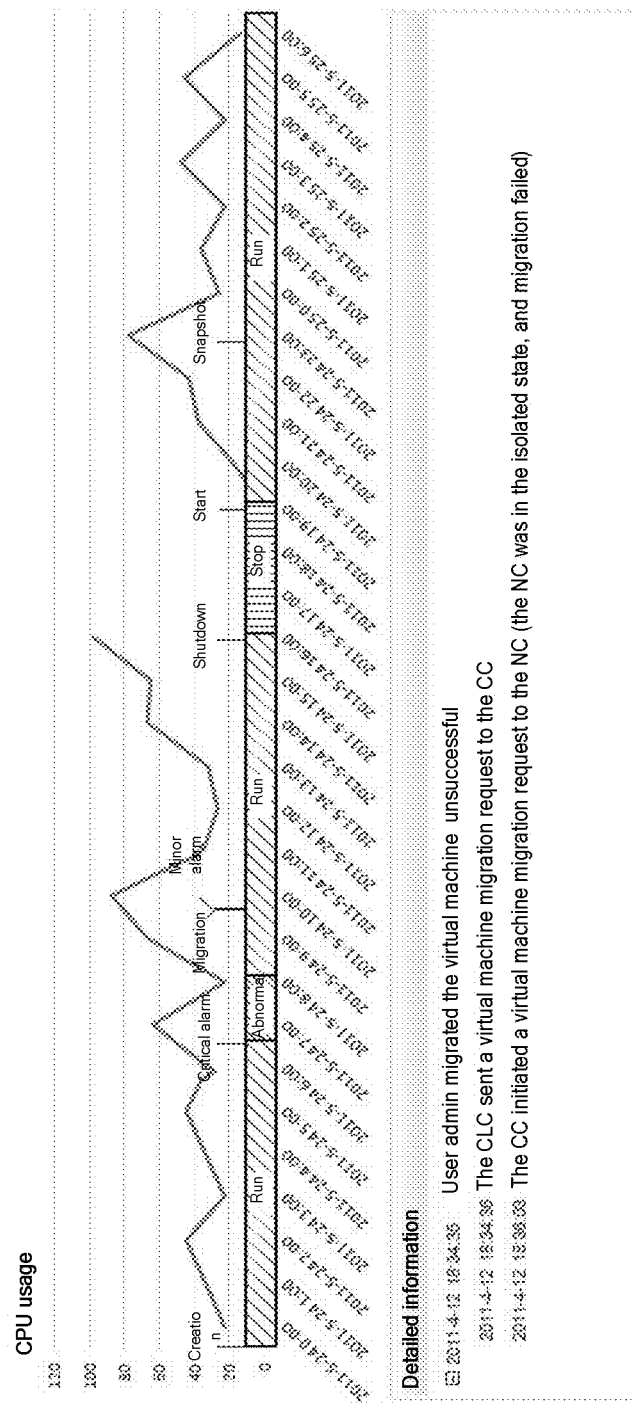
FIG. 3 is a schematic diagram of service transfer information of a migration operation provided by an operation and maintenance system according to an embodiment of the present invention.

FIG. 3 is a schematic diagram of service transfer information of a migration operation provided by an operation and maintenance system according to an embodiment of the present invention. In FIG. 3, service transfer information of a migration operation of the virtual machine that occurred at 18:34:35 on Apr. 12, 2011, at a cloud bottom layer, is displayed in the "Detailed information" area. In the information recorded therein, "2012-4-12 18:34:35 User admin migrated the virtual machine unsuccessful" indicates that this migration operation is unsuccessful. The information "A CLC sent a virtual machine migration request to a CC" and information "The CC initiated a virtual machine migration request to an NC (the NC was in a isolated state, and migration failed)" below describe the service transfer information of this migration operation, and "(the NC was in the isolated state, and migration failed)" describes that the cause of the failure of the migration operation is that the NC (Network Computer, network computer) was in the isolated state.

When an operation fails, service transfer information of the operation at the bottom layer may be viewed to determine the cause of the failure.

Figure 4:
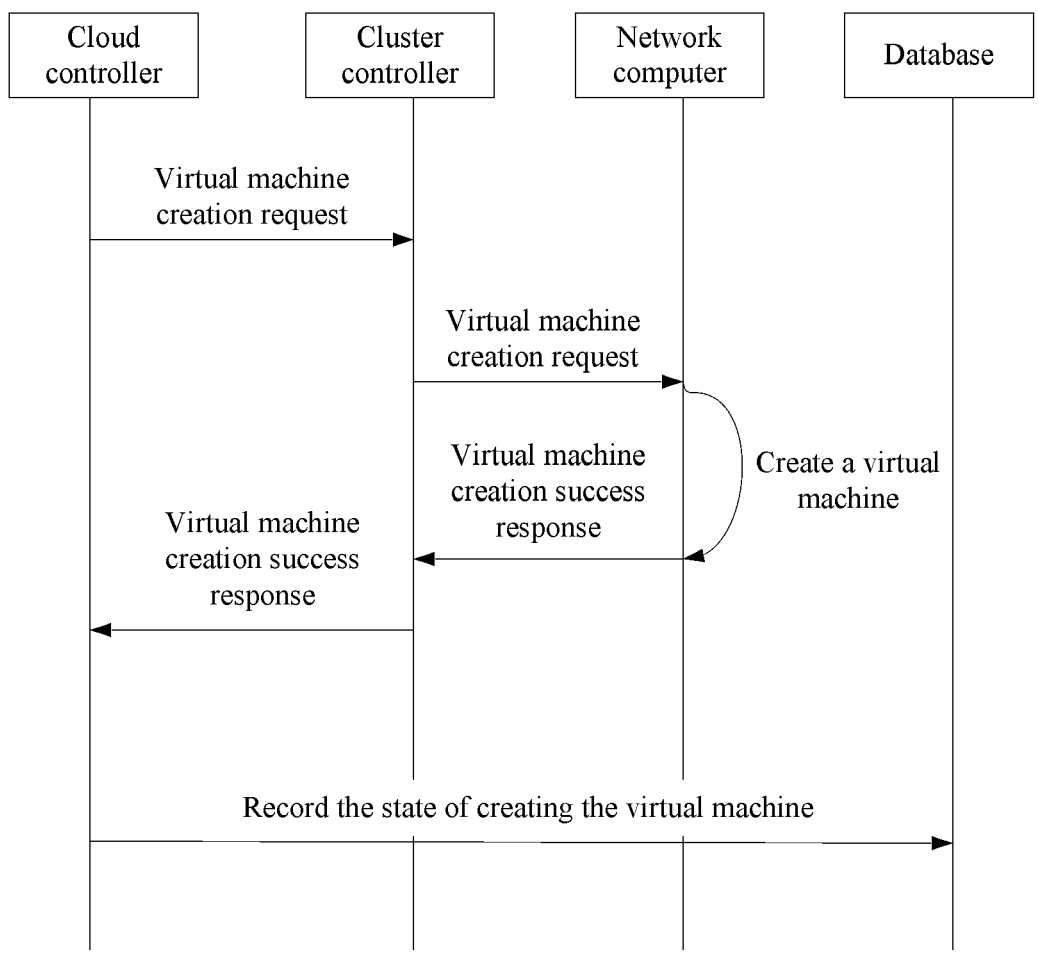
FIG. 4 is a schematic diagram showing a service transfer process of creating a virtual machine according to an embodiment of the present invention.

FIG. 4 is a schematic diagram showing a service transfer process of creating a virtual machine according to an embodiment of the present invention. As shown in FIG. 4, when a virtual machine is to be created on a server in a cloud system, a CLC (Cloud Controller, cloud controller) sends a virtual machine creation request to a CC (Cluster Controller, cluster controller); after the CC receives the request, the CC forwards the request to an NC (Network Computer, network computer); after a virtual machine is created successfully on the NC, the NC sends a virtual machine creation success response message to the CC; the CC forwards the response message to the CLC; and the CLC records, in a database, the state of creating the virtual machine.

An operation and maintenance system may query the database to obtain the service transfer information of the operation of creating the virtual machine.

Figure 5:
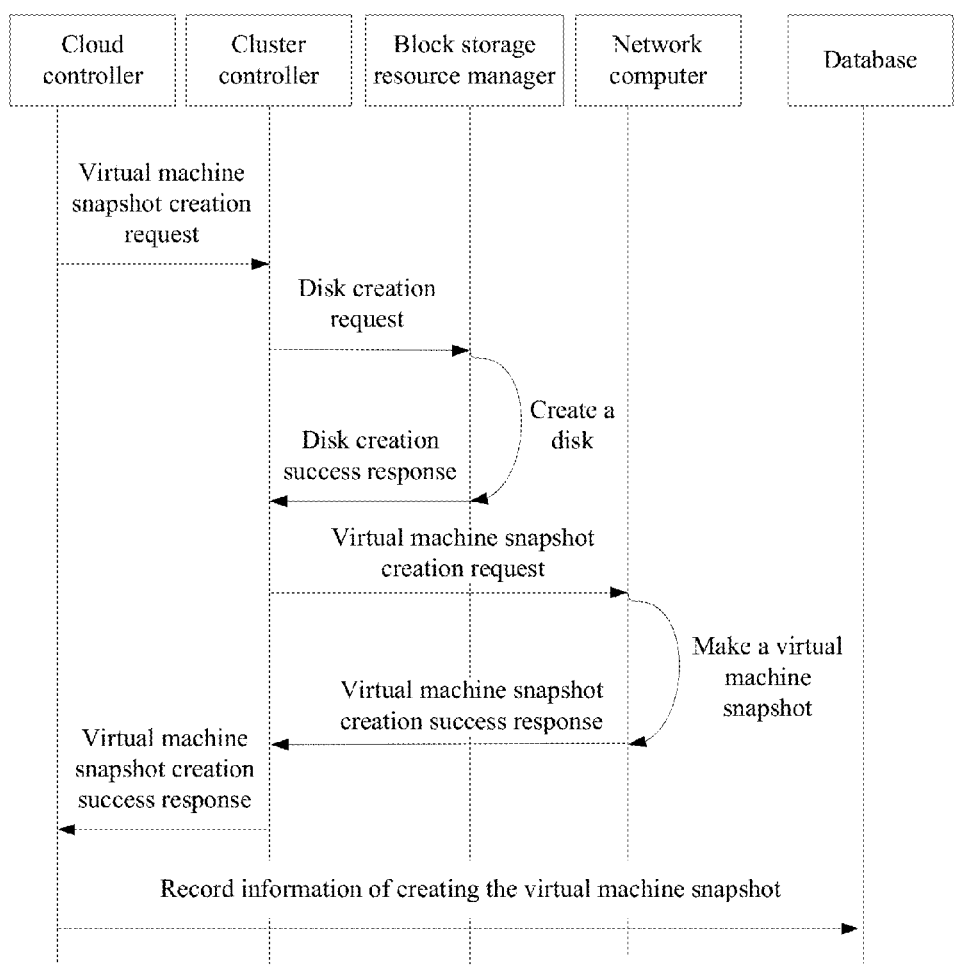
FIG. 5 is a schematic diagram showing a service transfer process of creating a virtual machine snapshot according to an embodiment of the present invention.

FIG. 5 is a schematic diagram showing a service transfer process of creating a virtual machine snapshot according to an embodiment of the present invention. The virtual machine snapshot refers to an image of a virtual file system, where the image has a read-only attribute at particular time. As shown in FIG. 5, when a virtual machine snapshot is to be created in a cloud system, a CLC sends a virtual machine snapshot creation request to a CC; after the CC receives the request, the CC sends, to a BRM (Block storage Resource Manager, block storage resource manager), a disk creation request with respect to the virtual machine snapshot creation request; after the BRM receives the request message, the BRM creates a disk and sends a disk creation success response message to the CC; after the CC receives the response message, the CC sends a virtual machine snapshot creation request to an NC; the NC creates the virtual machine snapshot and sends a virtual machine snapshot creation success response message to the CC; the CC forwards the virtual machine snapshot creation success response message to the CLC; and the CLC records, in a database, information of creating the virtual machine snapshot.

An operation and maintenance system may query the database to obtain the service transfer information of the operation of creating the virtual machine snapshot.

Figure 6:
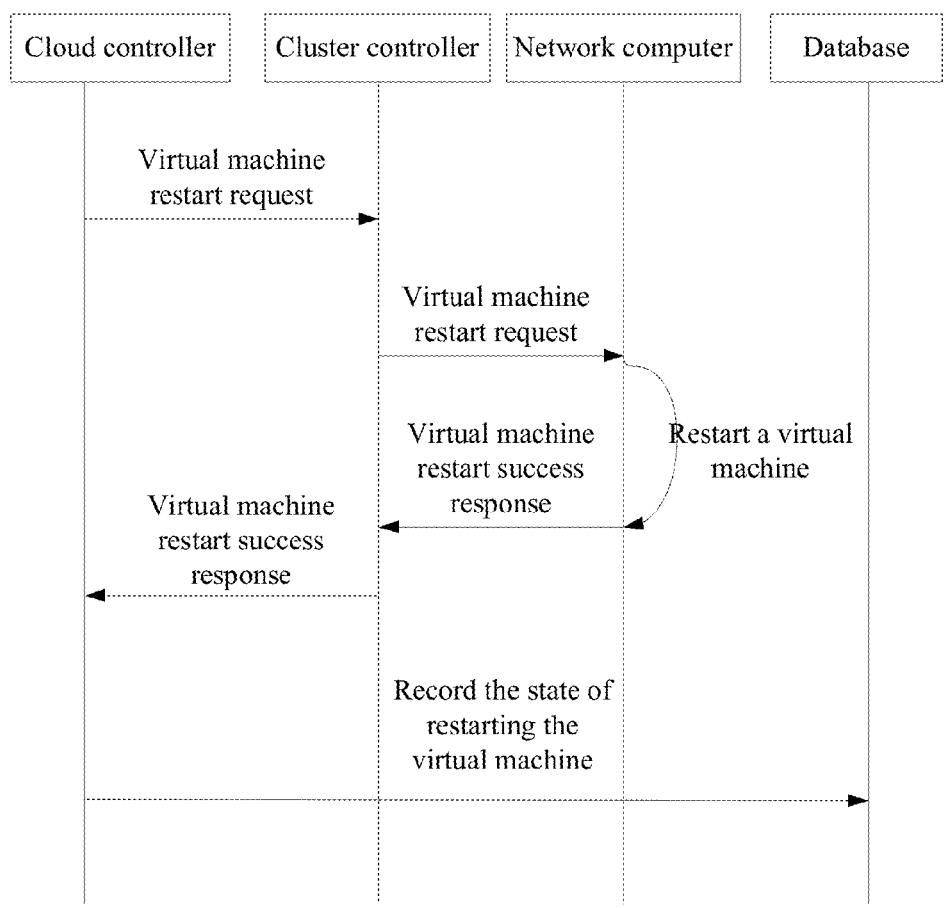
FIG. 6 is a schematic diagram showing a service transfer process of restarting a virtual machine according to an embodiment of the present invention.

FIG. 6 is a schematic diagram showing a service transfer process of restarting a virtual machine according to an embodiment of the present invention. As shown in FIG. 6, when a virtual machine is to be restarted in a cloud system, a CLC sends a virtual machine restart request to a CC; after the CC receives the request, the CC forwards the request to an NC; after the virtual machine is restarted successfully on the NC, the NC sends a virtual machine restart success response message to the CC; the CC forwards the response message to the CLC; and the CLC records, in a database, the state of restarting the virtual machine.

An operation and maintenance system may query the database to obtain the service transfer information of the operation of restarting the virtual machine.

Figure 7:
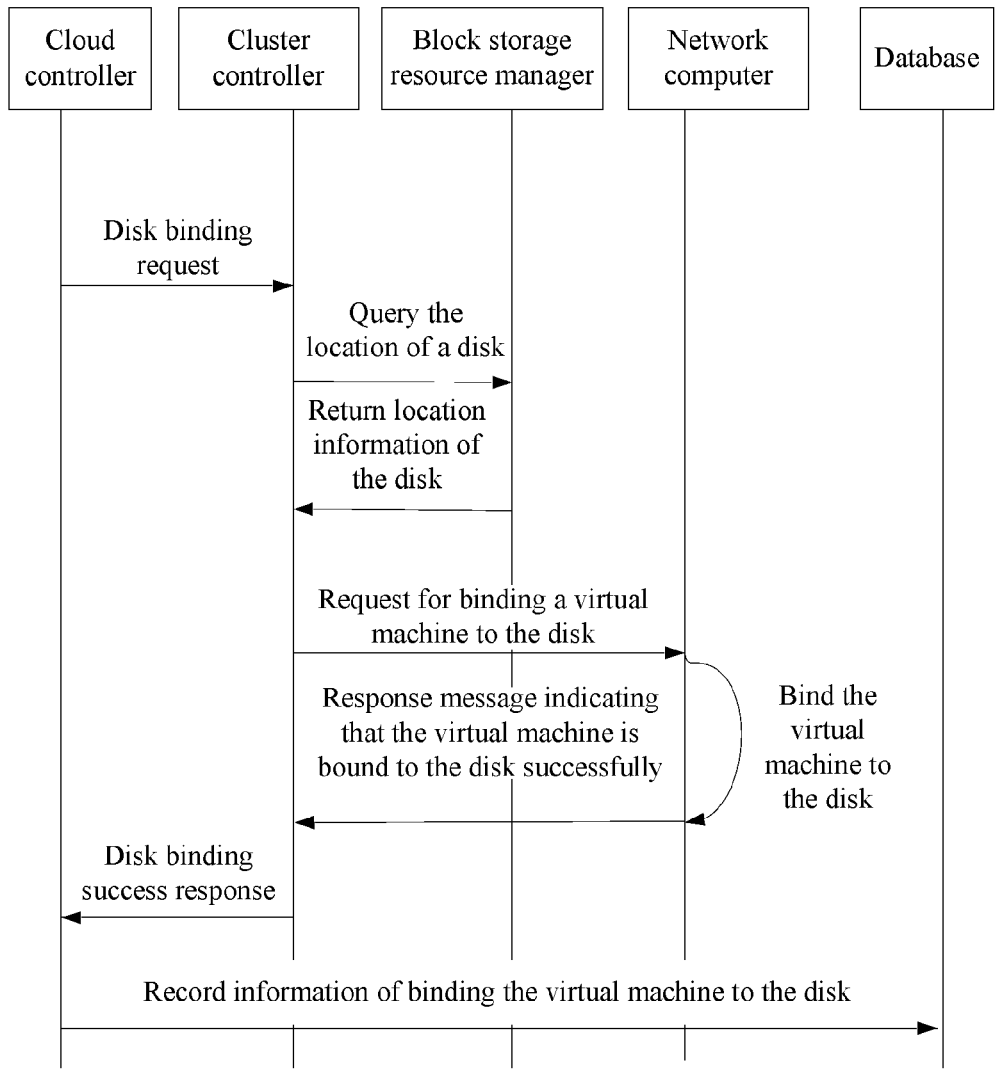
FIG. 7 is a schematic diagram showing a service transfer process of binding a virtual machine to a disk according to an embodiment of the present invention.

FIG. 7 is a schematic diagram showing a service transfer process of binding a virtual machine to a disk according to an embodiment of the present invention. As shown in FIG. 7, when a virtual machine is to be bound to a disk in a cloud system, a CLC sends a disk binding request to a CC; the CC sends a request to a BRM, for querying the location of the disk to be bound; the BRM returns location information of the disk to the CC; after the CC obtains the location information of the disk, the CC sends a request to an NC, for binding the virtual machine to the disk; after the NC finishes binding the virtual machine to the disk, the NC sends a response message to the CC, indicating that the virtual machine is bound to the disk successfully; the CC forwards the response message to the CLC; and the CLC records, in a database, information of binding the virtual machine to the disk.

An operation and maintenance system may query the database to obtain the service transfer information of the operation of binding the virtual machine to the disk.

Figure 8:
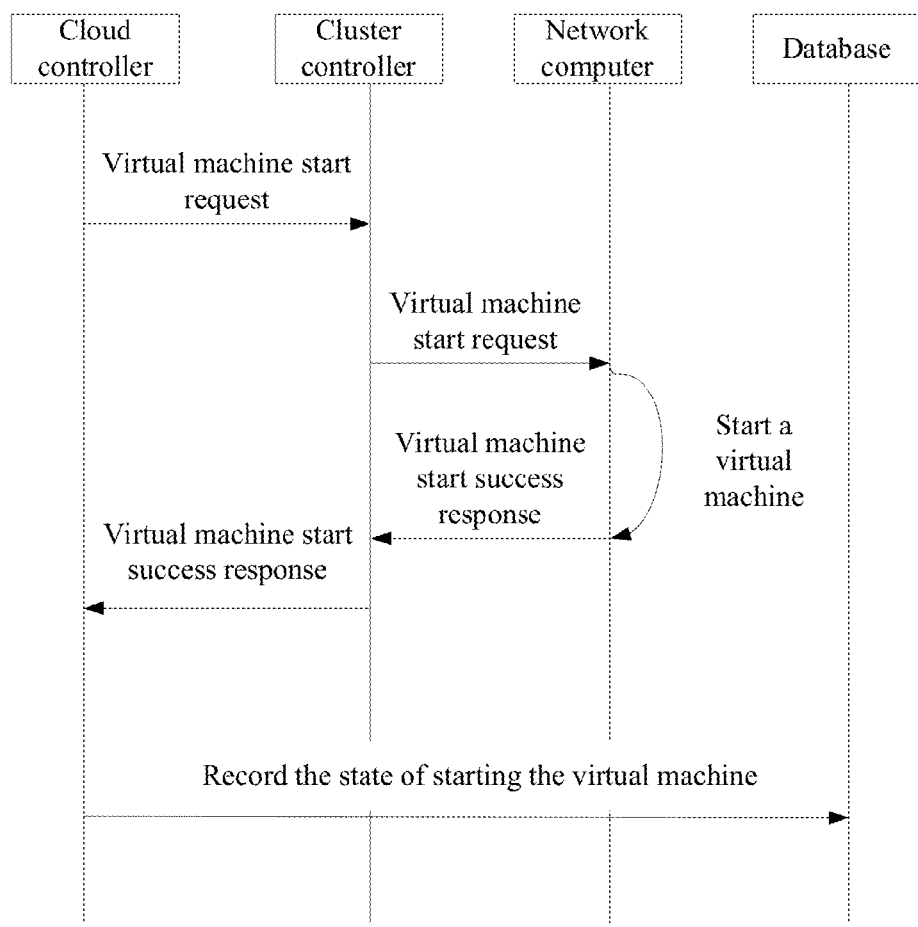
FIG. 8 is a schematic diagram showing a service transfer process of starting a virtual machine according to an embodiment of the present invention.

FIG. 8 is a schematic diagram showing a service transfer process of starting a virtual machine according to an embodiment of the present invention. As shown in FIG. 8, when a virtual machine is to be started in a cloud system, a CLC sends a virtual machine start request to a CC; after the CC receives the request, the CC forwards the request to an NC; after the virtual machine is started successfully on the NC, the NC sends a virtual machine start success response message to the CC; the CC forwards the response message to the CLC; and the CLC records, in a database, state of starting the virtual machine.

An operation and maintenance system may query the database to obtain the service transfer information of the operation of starting the virtual machine.

Figure 9:
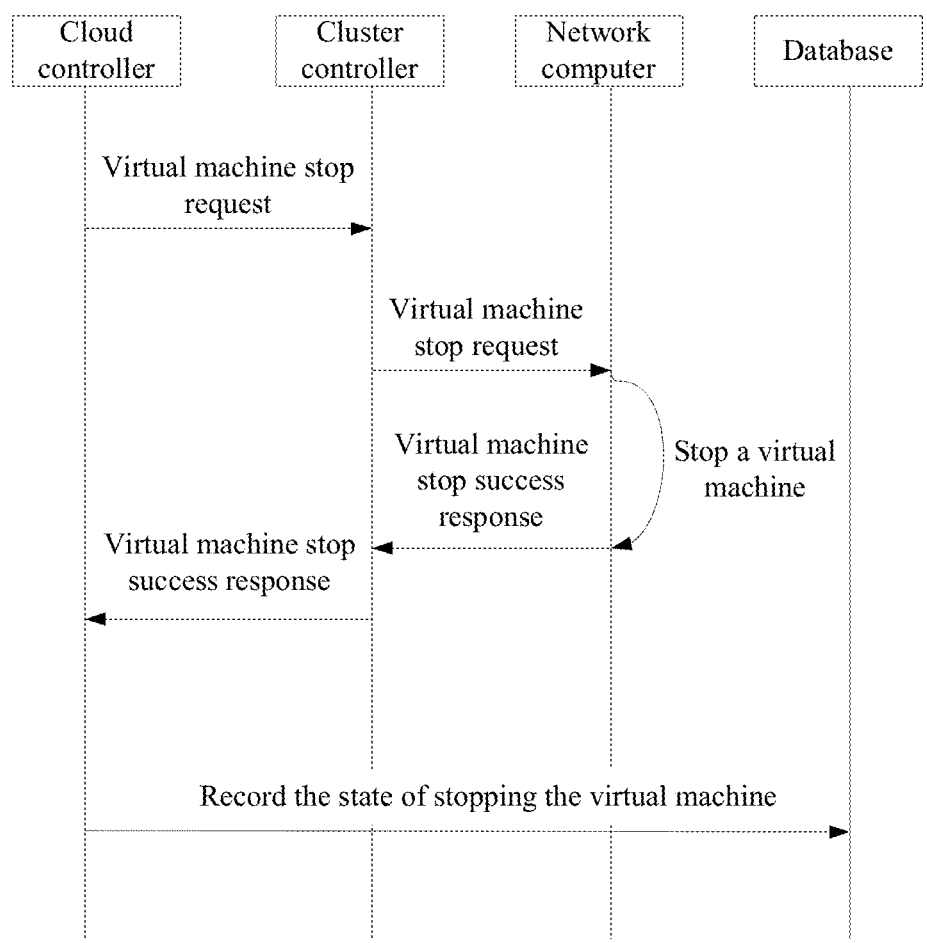
FIG. 9 is a schematic diagram showing a service transfer process of stopping a virtual machine according to an embodiment of the present invention.

FIG. 9 is a schematic diagram showing a service transfer process of stopping a virtual machine according to an embodiment of the present invention. As shown in FIG. 9, when a virtual machine is to be stopped in a cloud system, a CLC sends a virtual machine stop request to a CC; after the CC receives the request, the CC forwards the request to an NC; after the virtual machine is stopped successfully on the NC, the NC sends a virtual machine stop success response message to the CC; the CC forwards the response message to the CLC; and the CLC records, in a database, the state of stopping the virtual machine.

An operation and maintenance system may query the database to obtain the service transfer information of the operation of stopping the virtual machine.

Figure 10:
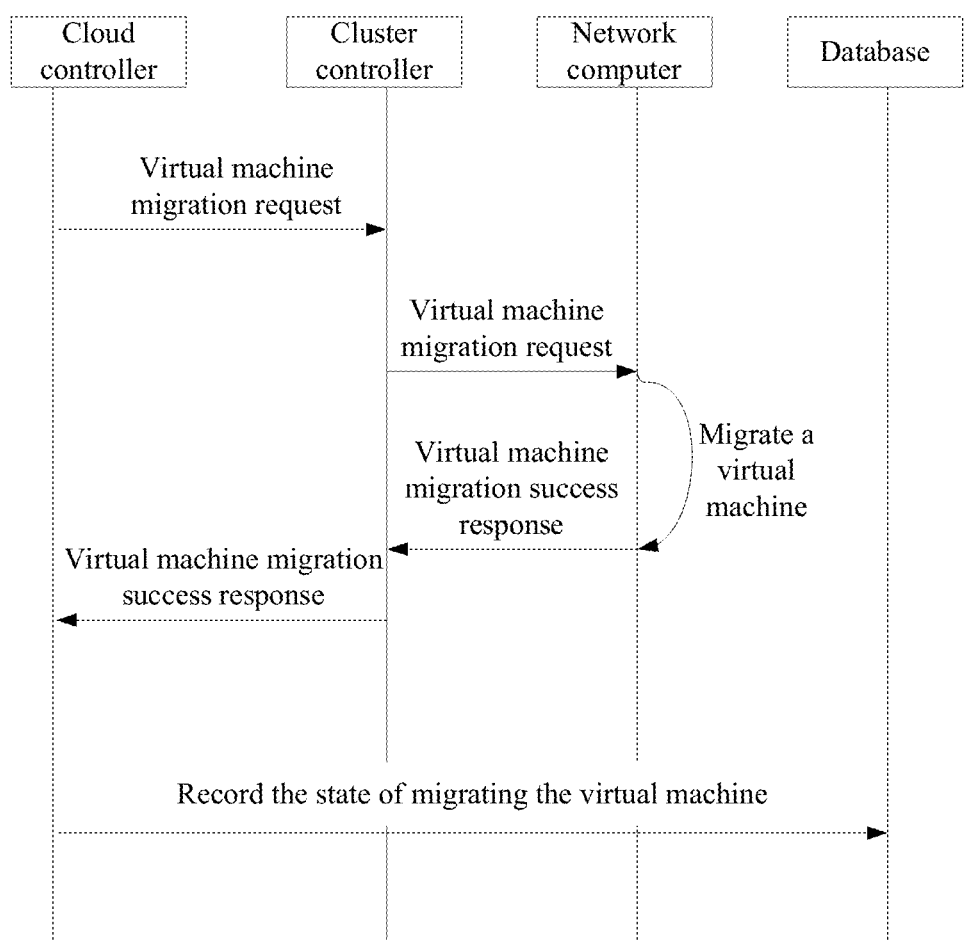
FIG. 10 is a schematic diagram showing a service transfer process of migrating a virtual machine according to an embodiment of the present invention.

FIG. 10 is a schematic diagram showing a service transfer process of migrating a virtual machine according to an embodiment of the present invention. As shown in FIG. 10, when a virtual machine is to be migrated in a cloud system, a CLC sends a virtual machine migration request to a CC; after the CC receives the request, the CC forwards the request to an NC; after the virtual machine is migrated successfully on the NC, the NC sends a virtual machine migration success response message to the CC; the CC forwards the response message to the CLC; and the CLC records, in a database, the state of migrating the virtual machine.

An operation and maintenance system may query the database to obtain the service transfer information of the operation of migrating the virtual machine.

The service transfer processes corresponding to the main operations of the virtual machine at the cloud bottom layer are described above.

Figures 11, 12:
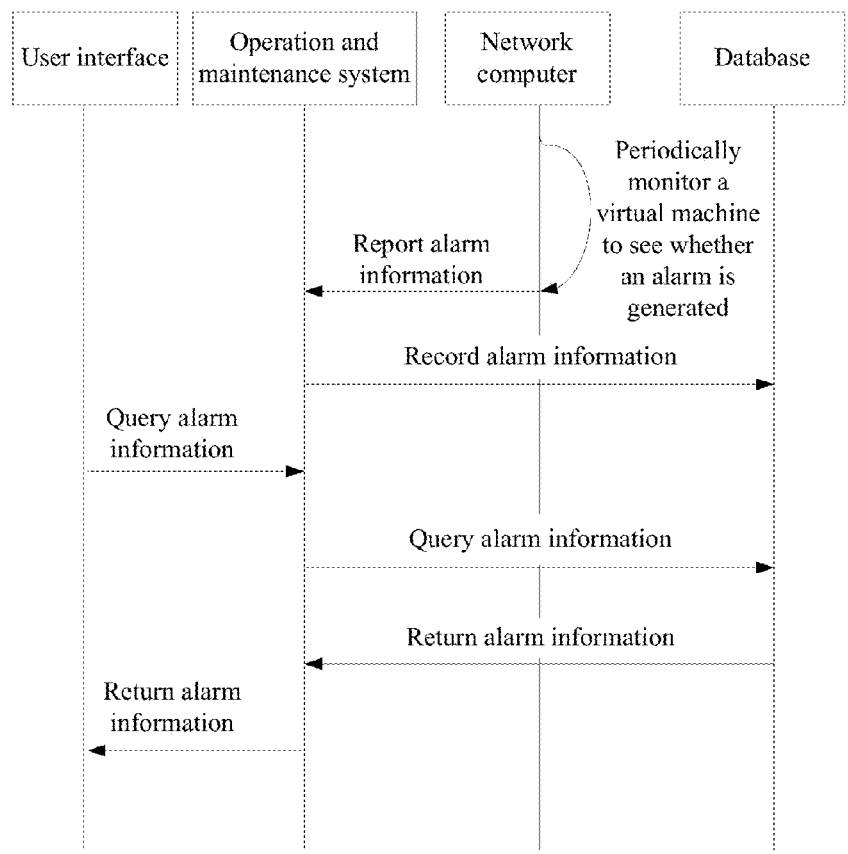
FIG. 11 is a schematic diagram showing relevant information of a critical alarm provided by an operation and maintenance system according to an embodiment of the present invention.
FIG. 12 is a schematic diagram showing a process of obtaining alarm information by an operation and maintenance system according to an embodiment of the present invention.

FIG. 11 is a schematic diagram showing relevant information of a critical alarm provided by an operation and maintenance system according to an embodiment of the present invention. In FIG. 11, general information such as an alarm cause, alarm name, alarm type, alarm level, and alarm identifier ID corresponding to an alarm are provided. If required by a user end, detailed information of the alarm may also be obtained through an operation and maintenance system.

The operation and maintenance system performs processing according to a processing instruction sent by the user end with respect to alarm level information, and obtains relevant information of the alarm corresponding to the alarm level information.

FIG. 12 is a schematic diagram showing a process of obtaining alarm information by an operation and maintenance system according to an embodiment of the present invention. As shown in FIG. 12, an NC periodically monitors whether an alarm is generated on a virtual machine. If alarm information is generated, the NC sends relevant information of an alarm to an OMS, and the OMS records the relevant information of the alarm in a database. After receiving a processing instruction sent by a user end with respect to alarm level information, an operation and maintenance system (OMS) queries the database for alarm information; the database returns the relevant information of the corresponding alarm to the OMS; and then the OMS sends the relevant information of the alarm to the user end.

In the embodiment of the present invention, after a virtual machine fails, an operation and maintenance system receives a failure message when the virtual machine fails, where the reported failure message carries identifier information of the virtual machine; obtains running information of the virtual machine according to the identifier information, where the running information of the virtual machine is used for diagnosing the failure of the virtual machine; generates graphic multi-dimensional display information of the virtual machine according to the running information; and sends the graphic multi-dimensional display information of the virtual machine to a user end for displaying. In this way, according to the graphic multi-dimensional display information, the user end can perform correlation analysis to diagnose the failure of the virtual machine, diagnose the cause of the failure of the virtual machine in a comprehensive multi-dimensional manner, and mine the deeper cause of the failure of the virtual machine, thereby improving the convenience and accuracy of diagnosing the virtual machine.

The process of the auxiliary method for diagnosing a failure of the virtual machine is described in the above embodiments. Correspondingly, an embodiment of the present invention provides an auxiliary apparatus for diagnosing a failure of the virtual machine.

Figure 13:
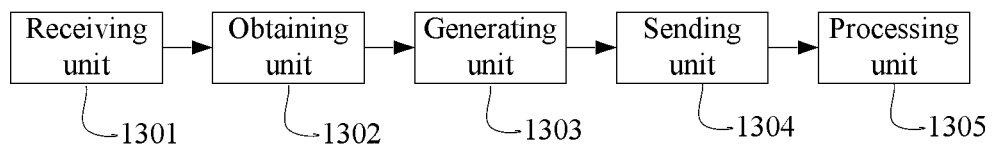
FIG. 13 is a schematic diagram of an auxiliary apparatus for diagnosing a failure of a virtual machine according to an embodiment of the present invention.

FIG. 13 is a schematic diagram of an auxiliary apparatus for diagnosing a failure of a virtual machine according to an embodiment of the present invention. As shown in FIG. 13, the embodiment includes the following units:

A receiving unit 1301 is configured to receive a failure message when a virtual machine fails, where the reported failure message carries identifier information of the virtual machine.

After the virtual machine fails, the virtual machine may send a failure message of the virtual machine through a virtual machine provider, and the virtual machine provider sends the failure message of the virtual machine to an operation and maintenance system, where the message carries the identifier information of the virtual machine, such as the name of the virtual machine, the IP address of the virtual machine, and the user name of a user of the virtual machine. If the virtual machine is a very important virtual machine, the operation and maintenance system may also actively monitor the running status of the virtual machine. If the virtual machine fails, the operation and maintenance system may receive a notification message.

An obtaining unit 1302 is configured to obtain running information of the virtual machine according to the identifier information, where the running information of the virtual machine is used for diagnosing the failure of the virtual machine.

The operation and maintenance system obtains running information of the virtual machine according to the identifier information of the virtual machine, and generates graphic multi-dimensional display information of the virtual machine according to the running information. The graphic multi-dimensional display information includes state information, operation identifier information, alarm level information, central processing unit CPU usage information, runtime information, and detailed information of the virtual machine.

A generating unit 1303 is configured to generate graphic multi-dimensional display information of the virtual machine according to the running information.

To make correlation between the state information, operation identifier information, alarm level information, detailed information, CPU usage information, and runtime information of the virtual machine clearer, the operation and maintenance system generates graphic multi-dimensional display information according to the running information of the virtual machine.

The generating unit 1303 is specifically configured to display the running information in different forms according to different categories in a coordinate system that uses the runtime information as an x-axis and uses the CPU usage information as a y-axis.

Multi-dimensional display information refers to displaying the state information, the operation identifier information, the alarm level information, the detailed information, the central processing unit CPU usage information, and the runtime information intuitively on a coordinate map in a chart, so that correlation between the state information, operation identifier information, alarm level information, detailed information, CPU usage information, and runtime information of the virtual machine is clearer.

The generating unit 1303 is specifically configured to: display the state information of the virtual machine above the x-axis of the coordinate system in the form of a combined color stripe and text label; display the operation identifier information and the alarm level information above the state information of the virtual machine in the form of a text label; display the runtime information below the x-axis of the coordinate system in the form of a text label; and display the CPU usage information in the coordinate system in the form of a broken line.

A sending unit 1304 is configured to send the graphic multi-dimensional display information of the virtual machine to a user end for displaying.

The operation and maintenance system sends the graphic multi-dimensional display information to the user end, so that a receiver side, for example, the user end, diagnoses the failure of the virtual machine after receiving the information.

The embodiment of the present invention further includes a processing unit 1305, configured to: after receiving a processing instruction of the user end with respect to operation identifier information corresponding to an operation of the virtual machine, obtain service transfer information corresponding to the operation, generate detailed information in the graphic multi-dimensional display information according to the service transfer information corresponding to the operation, and send the detailed information to the user end for displaying; or after receiving a processing instruction of the user end with respect to alarm level information corresponding to an alarm of the virtual machine, obtain relevant information of the alarm, generate detailed information in the graphic multi-dimensional display information according to the relevant information of the alarm, and send the detailed information to the user end for displaying.

Of course, after the user end receives the graphic multi-dimensional display information, if the user end cannot intuitively determine the cause of the failure of the virtual machine according to the graphic multi-dimensional display information directly, the user end sends a corresponding processing instruction with respect to the operation identifier information or alarm level information to the local to obtain the detailed information corresponding to the service transfer information of the operation corresponding to the operation identifier information or the detailed information corresponding to the relevant information of the alarm corresponding to the alarm level information; then the local performs processing according to the received processing instruction with respect to the operation identifier information or the alarm level information, and sends the detailed information corresponding to the service transfer information, which is obtained after the processing, of the operation corresponding to the operation identifier information, or the detailed information corresponding to the relevant information of the alarm corresponding to the alarm level information to the user end.

In the embodiment of the present invention, after a virtual machine fails, an operation and maintenance system receives a failure message reported when the virtual machine fails, where the reported failure message carries identifier information of the virtual machine; obtains running information of the virtual machine according to the identifier information, where the running information of the virtual machine is used for diagnosing the failure of the virtual machine; generates graphic multi-dimensional display information of the virtual machine according to the running information; and sends the graphic multi-dimensional display information of the virtual machine to a user end for displaying. The operation and maintenance system obtains the graphic multi-dimensional display information of the virtual machine centering on the virtual machine, and sends the graphic multi-dimensional display information to the user end. In this way, the user end can perform correlation analysis to diagnose the failure of the virtual machine, diagnose the cause of the failure of the virtual machine in a comprehensive multi-dimensional manner, and mine the deeper cause of the failure of the virtual machine, thereby improving the convenience and accuracy of diagnosing the virtual machine.

An embodiment of the present invention further provides an auxiliary system for diagnosing a failure of a virtual machine. In the system, an auxiliary method for diagnosing a failure of the virtual machine according to an embodiment of the present invention is applied. The system includes an auxiliary apparatus for diagnosing a failure of the virtual machine and further includes a virtual machine. In the auxiliary system for diagnosing a failure of the virtual machine, after a virtual machine fails, an operation and maintenance system receives a failure message reported when the virtual machine fails, where the reported failure message carries identifier information of the virtual machine; obtains running information of the virtual machine according to the identifier information, where the running information of the virtual machine is used for diagnosing the failure of the virtual machine; generates graphic multi-dimensional display information of the virtual machine according to the running information; and sends the graphic multi-dimensional display information of the virtual machine to a user end for displaying. Multi-dimensional information such as state information, operation information, alarm information, and CPU usage information of the virtual machine is identified in the graphic multi-dimensional display information. Therefore, the graphic multi-dimensional display information provides correlation analysis for diagnosing the failure of the virtual machine, the cause of the failure of the virtual machine can be diagnosed in a comprehensive multi-dimensional manner, and the deep cause of the failure of the virtual machine can be mined, thereby improving the convenience and accuracy of diagnosing the virtual machine. Therefore, the auxiliary system for diagnosing a failure of the virtual machine according to the embodiment of the present invention also falls within the protection scope of the present invention.

Those skilled in the art may further appreciate that exemplary units and algorithm steps provided in each embodiment can be implemented by electronic hardware, computer software, or a combination of the electronic hardware and computer software. To clearly describe the interchangeability of the hardware and software, the components and steps of each embodiment have already been described in general in the specification according to functionality. Whether the functions are performed by hardware or software depends on particular applications and design constraint conditions of the technical solutions. Those skilled in the art may use different methods to implement the described functions for each particular application, but it should not be considered that the implementation goes beyond the scope of the present invention.

The operations of the method or algorithm described herein may be implemented through hardware, or through a software module executed by a processor, or through both. The software module may be placed in a random access memory (RAM), a memory, a read only memory (ROM), an electrically programmable ROM, an electrically erasable programmable ROM, a register, a hard disk, a removable disk, a CD-ROM, or any other form of storage medium known in the art.

The objectives, technical solutions, and benefits of the present invention are further described in detail in the foregoing specific embodiments. It should be understood that the foregoing description is merely about the specific embodiments of the present invention, but is not intended to limit the protection scope of the present invention. Any modification, equivalent replacement, or improvement made within the idea and principle of the present invention shall fall within the protection scope of the present invention.

The invention claimed is:

1. An auxiliary method for diagnosing a failure of a virtual machine, wherein the method comprises:
receiving a failure message reported when a virtual machine fails, wherein the reported failure message carries identifier information of the virtual machine;

obtaining running information of the virtual machine according to the identifier information, wherein the running information of the virtual machine is used for diagnosing the failure of the virtual machine;

generating graphic multi-dimensional display information of the virtual machine according to the running information; and sending the graphic multi-dimensional display information of the virtual machine to a user end for displaying;

wherein: the graphic multi-dimensional display information comprises state information, operation identifier information, alarm level information, central processing unit CPU usage information, and runtime information of the virtual machine;

the graphic multi-dimensional display information further comprises detailed information, wherein the detailed information is detailed log information of an operation or alarm that occurs on the virtual machine; and the generated graphic multi-dimensional display information enables the user end to display the running information in different forms according to different categories in a coordinate system that uses the runtime information as an x-axis and uses the CPU usage information as a y-axis.

2. The auxiliary method for diagnosing a failure of a virtual machine according to claim 1, wherein the generated graphic multi-dimensional display information enables the user end to display the state information of the virtual machine above the x-axis of the coordinate system in a form of a combined color stripe and text label; displaying the operation identifier information and the alarm level information above the state information of the virtual machine in a form of a text label; displaying the runtime information below the x-axis of the coordinate system in a form of a text label; and displaying the CPU usage information in the coordinate system in a form of a broken line.

3. The auxiliary method for diagnosing a failure of a virtual machine according to claim 1, wherein after the sending the graphic multi-dimensional display information of the virtual machine to the user end for displaying, the method further comprises:

after receiving a processing instruction of the user end with respect to operation identifier information corresponding to an operation of the virtual machine, obtaining service transfer information corresponding to the operation, generating the detailed information in the graphic multi-dimensional display information according to the service transfer information corresponding to the operation, and sending the detailed information to the user end for displaying.

4. The auxiliary method for diagnosing a failure of a virtual machine according to claim 1, wherein after the sending the graphic multi-dimensional display information of the virtual machine to the user end for displaying, the method further comprises:

after receiving a processing instruction of the user end with respect to alarm level information corresponding to an alarm of the virtual machine, obtaining relevant information of the alarm, generating the detailed information in the graphic multi-dimensional display information according to the relevant information of the alarm, and sending the detailed information to the user end for displaying.

5. An auxiliary apparatus for diagnosing a failure of a virtual machine, wherein the apparatus comprises:

a memory storing instructions; and a processor coupled to the memory to execute the instructions to:

receive a failure message reported when a virtual machine fails, wherein the reported failure message carries identifier information of the virtual machine;

obtain running information of the virtual machine according to the identifier information, wherein the running information of the virtual machine is used for diagnosing the failure of the virtual machine;

generate graphic multi-dimensional display information of the virtual machine according to the running information; and send the graphic multi-dimensional display information of the virtual machine to a user end for displaying;

wherein: the graphic multi-dimensional display information comprises state information, operation identifier information, alarm level information, central processing unit CPU usage information, and runtime information of the virtual machine;

the graphic multi-dimensional display information further comprises detailed information, wherein the detailed information is detailed log information of an operation or alarm that occurs on the virtual machine; and the generated graphic multi-dimensional display information enables the user end to display the running information in different forms according to different categories in a coordinate system that uses the runtime information as an x-axis and uses the CPU usage information as a y-axis.

6. The auxiliary apparatus for diagnosing a failure of a virtual machine according to claim 5, wherein the generated graphic multi-dimensional display information enable the user end to display the state information of the virtual machine above the x-axis of the coordinate system in a form of a combined color stripe and text label; display the operation identifier information and the alarm level information above the state information of the virtual machine in a form of a text label; display the runtime information below the x-axis of the coordinate system in a form of a text label; and display the CPU usage information in the coordinate system in a form of a broken line.

7. The auxiliary apparatus for diagnosing a failure of a virtual machine according to claim 5, wherein the processor coupled to the memory further executes the instructions to:

after receiving a processing instruction of the user end with respect to operation identifier information corresponding to an operation of the virtual machine, obtain service transfer information corresponding to the operation, generate the detailed information in the graphic multi-dimensional display information according to the service transfer information corresponding to the operation, and send the detailed information to the user end for displaying.

8. The auxiliary apparatus for diagnosing a failure of a virtual machine according to claim 5, wherein the processor coupled to the memory to execute the instructions to:

after receiving a processing instruction of the user end with respect to alarm level information corresponding to an alarm of the virtual machine, obtain relevant information of the alarm, generate the detailed information in the graphic multi-dimensional display information according to the relevant information of the alarm, and send the detailed information to the user end for displaying.

9. An auxiliary system for diagnosing a failure of a virtual machine, wherein the system comprises an auxiliary apparatus for diagnosing the failure of the virtual machine and a virtual machine;

wherein the apparatus comprises:
a memory storing instructions; and
a processor coupled to the memory to execute the instructions to:
receive a failure message reported when a virtual machine fails, wherein the reported failure message carries identifier information of the virtual machine;
obtain running information of the virtual machine according to the identifier information, wherein the running information of the virtual machine is used for diagnosing the failure of the virtual machine;
generate graphic multi-dimensional display information of the virtual machine according to the running information; and
send the graphic multi-dimensional display information of the virtual machine to a user end for displaying;
wherein: the graphic multi-dimensional display information comprises state information, operation identifier information, alarm level information, central processing unit CPU usage information, and runtime information of the virtual machine;
the graphic multi-dimensional display information further comprises detailed information, wherein the detailed information is detailed log information of an operation or alarm that occurs on the virtual machine; and
the generated graphic multi-dimensional display information enables the user end to display the running information in different forms according to different categories in a coordinate system that uses the runtime information as an x-axis and uses the CPU usage information as a y-axis.

10. An auxiliary system for diagnosing a failure of a virtual machine, wherein the system comprises an auxiliary apparatus for diagnosing the failure of the virtual machine and the virtual machine;
wherein the apparatus comprises:
a memory storing instructions; and
a processor coupled to the memory to execute the instructions to:
receive a failure message reported when a virtual machine fails, wherein the reported failure message carries identifier information of the virtual machine;
obtain running information of the virtual machine according to the identifier information, wherein the running information of the virtual machine is used for diagnosing the failure of the virtual machine;
generate graphic multi-dimensional display information of the virtual machine according to the running information; and
send the graphic multi-dimensional display information of the virtual machine to a user end for displaying;
wherein: the graphic multi-dimensional display information comprises state information, operation identifier information, alarm level information, central processing unit CPU usage information, and runtime information of the virtual machine;
the graphic multi-dimensional display information further comprises detailed information, wherein the detailed information is detailed log information of an operation or alarm that occurs on the virtual machine; and
the generated graphic multi-dimensional display information enables the user end to display the state information of the virtual machine above the x-axis of the coordinate system in a form of a combined color stripe and text label; display the operation identifier information and the alarm level information above the state information of the virtual machine in a form of a text label; display the runtime information below the x-axis of the coordinate system in a form of a text label; and display the CPU usage information in the coordinate system in a form of a broken line.

11. An auxiliary system for diagnosing a failure of a virtual machine, wherein the system comprises an auxiliary apparatus for diagnosing the failure of the virtual machine and the virtual machine;
wherein the apparatus comprises:
a memory storing instructions; and
a processor coupled to the memory to execute the instructions to:
receive a failure message reported when a virtual machine fails, wherein the reported failure message carries identifier information of the virtual machine;
obtain running information of the virtual machine according to the identifier information, wherein the running information of the virtual machine is used for diagnosing the failure of the virtual machine;
generate graphic multi-dimensional display information of the virtual machine according to the running information; and
send the graphic multi-dimensional display information of the virtual machine to a user end for displaying;
wherein: the graphic multi-dimensional display information comprises state information, operation identifier information, alarm level information, central processing unit CPU usage information, and runtime information of the virtual machine;
the graphic multi-dimensional display information further comprises detailed information, wherein the detailed information is detailed log information of an operation or alarm that occurs on the virtual machine; and
the generated graphic multi-dimensional display information enables the user end to display the running information in different forms according to different categories in a coordinate system that uses the runtime information as an x-axis and uses the CPU usage information as a y-axis;
after receiving a processing instruction of the user end with respect to operation identifier information corresponding to an operation of the virtual machine, obtain service transfer information corresponding to the operation, generate the detailed information in the graphic multi-dimensional display information according to the service transfer information corresponding to the operation, and send the detailed information to the user end for displaying.

12. An auxiliary system for diagnosing a failure of a virtual machine, wherein the system comprises a auxiliary apparatus for diagnosing a failure of a virtual machine and the virtual machine;
wherein the apparatus comprises:
a memory storing instructions; and
a processor coupled to the memory to execute the instructions to:
receive a failure message reported when a virtual machine fails, wherein the reported failure message carries identifier information of the virtual machine;
obtain running information of the virtual machine according to the identifier information, wherein the running information of the virtual machine is used for diagnosing the failure of the virtual machine;
generate graphic multi-dimensional display information of the virtual machine according to the running information; and send the graphic multi-dimensional display information of the virtual machine to a user end for displaying;

wherein: the graphic multi-dimensional display information comprises state information, operation identifier information, alarm level information, central processing unit CPU usage information, and runtime information of the virtual machine;

the graphic multi-dimensional display information further comprises detailed information, wherein the detailed information is detailed log information of an operation or alarm that occurs on the virtual machine; and the generated graphic multi-dimensional display information enables the user end to display the state information of the virtual machine above the x-axis of the coordinate system in a form of a combined color stripe and text label; display the operation identifier information and the alarm level information above the state information of the virtual machine in a form of a text label; display the runtime information below the x-axis of the coordinate system in a form of a text label; and display the CPU usage information in the coordinate system in a form of a broken line; after receiving a processing instruction of the user end with respect to alarm level information corresponding to an alarm of the virtual machine, obtain relevant information of the alarm, generate the detailed information in the graphic multi-dimensional display information according to the relevant information of the alarm, and send the detailed information to the user end for displaying.

* * * * *